United States Patent [19]
Roberts

[11] 3,708,007
[45] Jan. 2, 1973

[54] PNEUMATIC TIRE INCLUDING BELT CABLES

[75] Inventor: Donald L. Roberts, Silver Lake, Ohio

[73] Assignee: The Goodyear Tire & Rubber Company, Akron, Ohio

[22] Filed: Oct. 28, 1970

[21] Appl. No.: 84,709

[52] U.S. Cl. ............................................. 152/361
[51] Int. Cl. ............................................. B60c 9/18
[58] Field of Search ............ 152/361, 175, 176, 187

[56] References Cited

UNITED STATES PATENTS 3,093,181  6/1963  Beckadolph..........................152/361

FOREIGN PATENTS OR APPLICATIONS 102,826  10/1962  Netherlands..........................152/361
808,548  2/1959  Great Britain.........................152/361

Primary Examiner—Gerald M. Forlenza
Assistant Examiner—George H. Libman
Attorney—F. W. Brunner and Michael L. Gill

[57] ABSTRACT

A radial ply pneumatic tire having a pair of folded belt plies which includes an inextensible cable extending circumferentially about the tire in the fold of each belt ply which is located adjacent the lateral edges of the tread.

7 Claims, 2 Drawing Figures

PATENTED JAN 2 1973

3,708,007

INVENTOR.
DONALD L. ROBERTS

Michael L. Gill
ATTORNEY

PNEUMATIC TIRE INCLUDING BELT CABLES

The foregoing abstract is not to be taken as limiting the invention of this application, and in order to understand the full nature and extent of the technical disclosure of this application, reference must be made to the accompanying drawing and the following detailed description.

This invention relates to pneumatic tires and in particular to tread reinforcements in tires suitable for highway use at turnpike speeds over the normal life of tires such as those on equipment or vehicles as supplied by the manufacturer.

The useful life of a tire is dependent upon, among other things, the life of the non-skid portion and the durability of the structural components. One way of improving the life of a non-skid portion is to make the tread portion rigid so as to prevent flexing or squirming of the tread as it passes through the footprint. The present invention provides such a stable tread by utilizing a novel belt structure having inextensible flexible rings disposed about the tire in the lateral edge portions of the belt. This structure, in addition to providing a flat rigid tread, also affords good durability in the lateral edge portions of the belt structure.

It is an object of this invention to provide a tire having a stable belt structure which is substantially flat in planes containing the rotational axis of the tire. It is a further object of this invention to provide a tire having a stable tread which has good durability, particularly with respect to the lateral edges of the tread.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figures 1, 2:
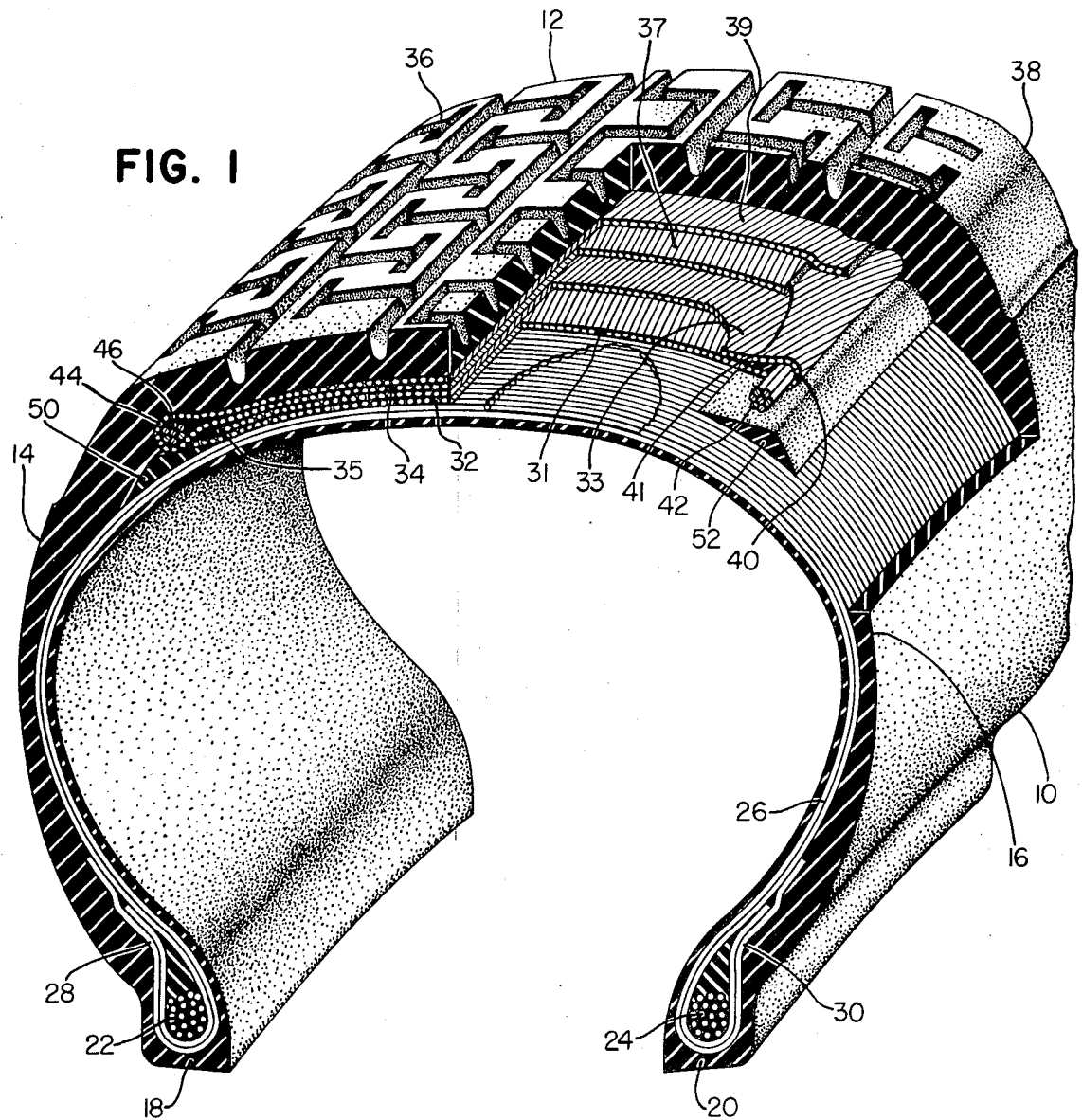
FIG. 1 is a sectional perspective view of a tire constructed in accordance with this invention.
FIG. 2 is a fragmentary sectional view of a tire illustrating an alternate embodiment of this invention.

With reference to FIG. 1 a tire 10 constructed in accordance with this invention has a profiled tread portion or anti-skid portion 12 extending circumferentially thereabout. A pair of sidewalls 14 and 16 extend radially inwardly from the tread portion 12 and terminate in bead portions 18 and 20. Each bead portion 18 and 20 has an annular inextensible bead core 22 and 24, respectively. A pair of carcass plies 26 extend circumferentially about the tire and from bead portion 18 through the sidewall 14, beneath the tread portion 12 and through the sidewall 16 to the bead portion 20. The radially inner ends 28 and 30 of the carcass plies 26 are turned respectively about the bead rings 22 and 24. In the particular embodiment illustrated each ply 26 comprises generally radially extending tire cords. The plies are radial in that the cords in each ply form an angle of between about 75° and 90° with respect to the mid-circumferential centerplane. The mid-circumferential centerplane is a plane which is perpendicular to the rotational axis of the tire and disposed mid-way between the bead portions 18 and 20. For purposes of this invention the cord angle of any ply is the angle the cords in the ply make with the mid-circumferential centerplane.

A pair of folded belt plies 32 and 34 are disposed successively radially outwardly of the carcass plies 26 and extend laterally of the tire 10 substantially from the lateral edge or shoulder 36 of the tread portion 12 to the other lateral edge or shoulder 38 of the tread portion 12. The radially inner folded belt ply 32 has a fold 40 in its lateral edge beneath the shoulder 38 of the tread 12 which extends circumferentially about the tire 10. An inextensible, flexible ring 42 is disposed in the fold 40 and extends circumferentially about the tire 10. The radially outer belt ply 34 has a fold 44 in its lateral edge beneath the shoulder 36 of the tread 12 which extends circumferentially about the tire 10. An inextensible flexible ring 46 is disposed in the fold 44 and extends circumferentially about the tire. The rings 42 and 46 are located at the lateral edges of the belt and in the area of the shoulders only. They are the only substantially inextensible load carrying members that extend substantially in a circumferential direction about the tire and form a part of the belt structure.

The radially inner belt ply 32 has inner and outer fabric layers or portions 31 and 33 which extend laterally across the tread portion 12 from the fold 40 and terminate short of the inextensible ring 46 in the radially outer folded belt ply 34. The radially inner fabric portion 31 of the inner belt ply 32 extends laterally beyond the lateral edge 35 of the radially outer fabric portion 33 of the inner belt ply 32 and thus encases the lateral edge 35 between the radially inner fabric portion 31 and the radially outer belt ply 34.

The radially outer belt ply 34 has inner and outer fabric layers or portion 37 and 39 which extend laterally across the tread portion 12 from the fold 44 and terminates short of the inextensible ring 42 in the radially inner belt ply 32. The radially outer fabric portion 39 extends laterally of the tire beyond the lateral edge 41 of the radially inner fabric portion 37 of the outer belt ply 34 and thus encases the lateral edge 41 between the outer fabric portion 39 of the outer belt ply 34 and the radially inner belt ply 32. This lateral step-off arrangement just short of the annular bead cores provides a belt structure which is substantially constant in thickness across the tread portion and reduces the number of lateral ply endings that are not encased.

Since the belt structure is substantially flat across the tread profile and the radial carcass plies 26 are curved in the area beneath the tread portion 12, a pair of annular wedge shaped strips of rubber 50 and 52 are disposed between the carcass plies 26 and the respective folded portions 44 and 40 of the plies 34 and 32.

The annular rings 42 and 44 can be of any material or structure desired such as cabled wire or fiberglass. The rings, however, should be substantially inextensible and have sufficient flexibility to accommodate the flexing of the tire during normal use on a vehicle at turnpike speeds.

Each belt ply 32 and 34 is rubber coated fabric made of continuous tire cords disposed at an angle of between 10° and 30° with respect to the mid-circumferential centerplane. In the specific embodiment illustrated the cords extend at an angle of about 12° with respect to the mid-circumferential centerplane. Each successive radially outer portion or fabric layer (31, 33, 37 and 39) of the belt plies is disposed at an angle of opposite sign with respect to the next adjacent portion of a belt ply; that is to say, the cords in adjacent belt fabric layers extend at opposite angles with respect to the mid-circumferential centerplane. The combination of the inextensible flexible rings in the folds in the lateral edges of the belt plies provides a firm generally cylindrical belt structure and a very stable tread portion.

In an alternate embodiment of the invention illustrated in FIG. 2, the tire contains two carcass plies 60. A pair of inextensible rings 62 and 64 are disposed one each generally near the lateral edges of the tread and extend circumferentially about the tire in a manner similar to those illustrated in FIG. 1. A ply or layer of tire cord fabric 66 extends circumferentially of the tire about the carcass ply 60 and has its lateral ends or portions 68 and 70 folded about the respective inextensible ring 62 or 64 and extending laterally across the tire beneath the tread substantially to the opposite inextensible ring 64 or 62. A single layer of tire cord fabric 72 is disposed between the lateral ends or portions 68 and 70. The cord angle of the layer 72 is equal to that of the ends or portions 68 and 70 but opposite in sign. The layer 72 also extends circumferentially about the tire but terminates in the lateral directions short of the edges 74 and 76 of the ends 68 and 70. Again the cord fabric in the belt structure comprises continuous tire cords which should extend at an angle of between about 10° and 30° with respect to the mid-circumferential centerplane.

While in the specific embodiments illustrated there are two radial plies of tire cord fabric, it is not intended that this invention be limited to such a construction but rather that it should include carcasses having one or more plies of radial tire cord fabric, or carcasses having plies of bias laid tire cord fabric. The tire cord fabric or tire cords in the carcass or belt plies may be of any material appropriate for use in tires such as, by way of example only, nylon, rayon, polyester, fiberglass or steel. Further, it is not intended that this invention be limited to any particular number of layers of fabric in the belt structure.

While certain representative embodiments and details have been shown for the purpose of illustrating the invention, it will be apparent to those skilled in this art that various changes and modifications be made therein without departing from the spirit or scope of the invention.

What is claimed is:

1. A pneumatic tire having a profiled tread portion, a pair of annular inextensible beads, a carcass of tire cord fabric extending from bead to bead and having its radially inner ends turned up about said beads, a circumferentially extending inextensible flexible ring disposed beneath each lateral edge of said tread only, a belt comprising one ply of tire cord fabric folded about one said flexible ring and having both layers thereof extending laterally across said tread portion substantially to the other said flexible ring and a second ply of tire cord fabric folded about said other said flexible ring and having both layers thereof extending laterally across said tread portion substantially to said one said flexible ring.

2. A tire as claimed in claim 1, wherein the cord angle of the tire cord fabric in said carcass is between about 75° and 90°.

3. A tire as claimed in claim 2, wherein the cord angle of the tire cord fabric in said belts is between about 10° and 30°.

4. A tire as claimed in claim 2, wherein each said ring comprises a plurality of wire strands.

5. A tire as claimed in claim 3, wherein said ring is made of fiberglass.

6. A pneumatic tire having a profiled tread portion; a pair of annular inextensible beads; a carcass of tire cord fabric extending from bead to bead and having its radially inner ends turned up and about said beads; a circumferentially extending inextensible flexible ring disposed generally beneath each lateral edge of said tread only; a belt including at least one ply of tire cord fabric extending circumferentially about said carcass and beneath said tread said ply having lateral portions which are respectively folded about said rings and each lateral portion extending laterally across said tread substantially to the respectively opposite ring; and an additional ply of tire cord fabric extending circumferentially about the tire disposed between said lateral portions and encased entirely between said lateral portions.

7. A tire as claimed in claim 6, wherein the cord angle of the tire cord fabric in said carcass is between about 75° and 90° and the cord angle of the tire cord fabric in said belt is between about 10° and 30°.

* * * * *